(12) United States Patent
Wu (10) Patent No.: US 9,930,632 B2
(45) Date of Patent: Mar. 27, 2018

(54) M2M APPLICATION REMOTE REGISTRATION METHOD, DEVICE, SYSTEM AND STORAGE MEDIUM

(71) Applicant: ZTE Corporation, Shenzhen, Guangdong (CN)

(72) Inventor: Hao Wu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 11 days.

(21) Appl. No.: 15/032,116

(22) PCT Filed: Jun. 10, 2014

(86) PCT No.: PCT/CN2014/079642
§ 371 (c)(1),
(2) Date: Apr. 26, 2016

(87) PCT Pub. No.: WO2014/180438
PCT Pub. Date: Nov. 13, 2014

(65) Prior Publication Data
US 2016/0270021 A1  Sep. 15, 2016

(30) Foreign Application Priority Data
Nov. 4, 2013 (CN) .................... 2013 1 0539285

(51) Int. Cl.
*H04W 60/04* (2009.01)
*H04W 4/00* (2009.01)
(Continued)

(52) U.S. Cl.
CPC ......... *H04W 60/04* (2013.01); *H04L 61/3015* (2013.01); *H04L 67/16* (2013.01);
(Continued)

(58) Field of Classification Search
CPC ..... H04W 60/04; H04W 8/005; H04W 4/005; H04L 67/16; H04L 61/3015; H04L 67/32
See application file for complete search history.

(56) References Cited

U.S. PATENT DOCUMENTS

| 2011/0213871 A1 | 9/2011 | Digirolamo |
| 2013/0003655 A1 | 1/2013 | Dietz |

(Continued)

FOREIGN PATENT DOCUMENTS

| CN | 102378223 A | 3/2012 |
| CN | 102804738 A | 11/2012 |
| EP | 2528295 A1 | 11/2012 |

OTHER PUBLICATIONS

ONeM2M Functional Architecture, Sep. 19, 2013, V.0.1.1.*
(Continued)

*Primary Examiner* — Mohammad Adhami
*Assistant Examiner* — Shailendra Kumar
(74) *Attorney, Agent, or Firm* — Cooper Legal Group, LLC (57) ABSTRACT

A method, device, system and a computer storage medium for remote registration of a Machine-to-Machine (M2M) application are provided. The method includes that: a local Common Service Entity (CSE) receives a first registration request message from the M2M application, reads a CSE list in the remote registration parameter when determining that the first registration request message includes a remote registration parameter and determining an activation indication parameter in the remote registration parameter represents that remote registration is required to be executed, and sends a second registration request message corresponding to the first registration request message according to the CSE list when it is determined that the CSE list is not empty and target CSEs in the CSE list have been registered on the local CSE.

13 Claims, 4 Drawing Sheets

(51) Int. Cl.
H04L 29/12 (2006.01)
H04W 8/00 (2009.01)
H04L 29/08 (2006.01)

(52) U.S. Cl.
CPC ............ *H04L 67/32* (2013.01); *H04W 4/005* (2013.01); *H04W 8/005* (2013.01)

(56) References Cited

U.S. PATENT DOCUMENTS

2013/0066965 A1* 3/2013 Foti .................. H04L 67/24 709/204
2016/0112981 A1* 4/2016 Ahn .................. H04W 64/00 455/500

OTHER PUBLICATIONS

OneM2M Functional Architecture [online],"Sep. 19, 2013 (Sep. 19, 2013), [retrieved date: Aug. 25, 2014]", retrieved from the Internet: URL:ftp://ftp.onem2m.org Meetings/ ARC/20I3%20meetings/ 20130919 ARC6.5/oneM2M ARC 2013 0381R01 Functional Architecture Spec TS 0001 vO 1 O.ZIP/oneM2M TS 0001 oneM2M Functional Architecture VO.I.Ipj.doc, see sections 6 29, 55 pgs.
International Search Report in international application No. PCT/CN2014/079642, dated Sep. 15, 2014, 6 pgs.
Written Opinion of the International Search Authority in international application No. PCT/CN2014/079642, dated Sep. 15, 2014, 12 pgs.
International Search Report in international application No. PCT/CN2014/079642, dated Sep. 15, 2014, 2 pgs.
English Translation of the Written Opinion of the International Search Authority in international application No. PCT/CN2014/079642, dated Sep. 15, 2014, 8 pgs.
OneM2M Functional Architecture [online],"Sep. 20, 2013 (Sep. 20, 2013), [retrieved date: Aug. 25, 2014]", retrieved from the Internet: URL:ftp://ftp.onem2m.org Meetings/ ARC/20I3%20meetings/ 20130919 ARC6.5/oneM2M ARC 2013 0381R01 Functional Architecture Spec TS 0001 vO 1 O.ZIP/oneM2M TS 0001 oneM2M Functional Architecture VO.I.Ipj.doc, see sections 6 29, 55 pgs.
Supplementary European Search Report in European application No. 14795438.2, dated Oct. 20, 2016, 8 pgs.

* cited by examiner

M2M APPLICATION REMOTE REGISTRATION METHOD, DEVICE, SYSTEM AND STORAGE MEDIUM

TECHNICAL FIELD

The disclosure relates to a communication technology, and in particular to a method, device, system and computer storage medium for remote registration of a Machine-to-Machine (M2M) application.

BACKGROUND

In a conventional M2M service, only M2M applications perform communications, for example, in an intelligent electric meter service managed by a grid company, only an application on an intelligent electric meter of a terminal is required to interact with an application on a server managed by the grid company. However, along with expansion of an M2M service, different M2M applications may be required to interact with each other, for example, an intelligent home appliance may enjoy not only online failure diagnosis and maintenance service provided by an intelligent home appliance company but also online movie service and the like provided by a video service provider. In a scenario of interactions among multiple M2M applications, an existing technical solution of only registering an application with a local Common Service Entity (CSE) may not meet a requirement of application discovery in a multi-application interaction scenario, and when M2M applications required to interact with each other are not registered with the same CSE, it is impossible to implement mutual discovery, which may make it difficult to implement interactions among the multiple applications.

SUMMARY

In order to solve the existing technical problem, the embodiments of the disclosure are intended to provide a method, device and system for remote registration of an M2M application, which may implement interactions among M2M applications registered on different CSEs and improve a user experience.

In order to achieve the purpose, the technical solutions of the embodiments of the disclosure are implemented as follows.

An embodiment of the disclosure provides a method for remote registration of an M2M application, which may be applied to a local CSE, the method including that:

the local CSE receives a first registration request message, and reads a CSE list in a remote registration parameter when determining that the first registration request message includes the remote registration parameter and when determining that an activation indication parameter in the remote registration parameter represents that remote registration is required to be executed; and the local CSE sends a second registration request message corresponding to the first registration request message according to the CSE list when determining that the CSE list is not empty and target CSEs in the CSE list have been registered on the local CSE.

Preferably, when the CSE list is empty, the method may further include that:

the local CSE adds a CSE which has been registered on the local CSE into the CSE list, and sends the second registration request message corresponding to the first registration request message according to the CSE list.

Preferably, when the CSE list is empty, the method may further include that:

the local CSE adds a CSE matching with a registration strategy into the CSE list according to the pre-configured registration strategy, and sends the second registration request message corresponding to the first registration request message according to the CSE list.

Preferably, when the local CSE determines that the CSE list includes a CSE which is not registered on the local CSE, the method may further include that:

the CSE which is not registered on the local CSE is deleted from the CSE list, and the second registration request message corresponding to the first registration request message is sent according to the CSE list.

Preferably, the step that the second registration request message corresponding to the first registration request message is sent according to the CSE list may include that:

the second registration request message corresponding to the first registration request message is sent according to identifiers or addresses of the target CSEs in the CSE list, wherein the second registration request message may include: an identifier or address of the M2M application, and an identifier or address of the local CSE.

Preferably, the method may further include that:

after receiving all response messages of the second registration request message, the local CSE determines a target CSE which is unsuccessfully remotely registered, deletes the target CSE which is unsuccessfully remotely registered from the CSE list, and sends a response message of the first registration request message;

wherein the response message of the first registration request message may include the CSE list, and the CSE list may include target CSEs which are successfully remotely registered.

An embodiment of the disclosure further provides a method for remote registration of an M2M application, which may be applied to a target CSE, the method including:

the target CSE receives a second registration request message, creates a resource according to the second registration request message, acquires and stores resource attribute information, and sends a second response message corresponding to the second registration request message after the resource is created, wherein the resource attribute information may include a resource address link of the M2M application on a local CSE.

An embodiment of the disclosure further provides a method for remote registration of an M2M application, which may include that:

a local CSE receives a first registration request message, and reads a CSE list in a remote registration parameter when determining that the first registration request message includes a remote registration parameter and when determining that an activation indication parameter in the remote registration parameter represents that remote registration is required to be executed;

the local CSE sends a second registration request message corresponding to the first registration request message according to the CSE list when determining that the CSE list is not empty and all target CSEs in the CSE list have been registered on the local CSE; and the target CSEs receive the second registration request message, create resources according to the second registration request message, acquire and store resource attribute information, and send second response messages corresponding to the second registration request message after the resources are created, wherein the resource attribute information may include a resource address link of the M2M application on the local CSE.

Preferably, when the CSE list is empty, the method may further include that:

the local CSE adds a CSE which has been registered on the local CSE into the CSE list, and sends the second registration request message corresponding to the first registration request message to all the target CSEs in the CSE list.

Preferably, when the CSE list is empty, the method may further include that:

the local CSE adds a CSE matching with a registration strategy into the CSE list according to the pre-configured registration strategy, and sends the second registration request message corresponding to the first registration request message to all the target CSEs in the CSE list.

Preferably, when the local CSE determines that the CSE list includes a CSE which is not registered on the local CSE, the method may further include that:

the CSE which is not registered on the local CSE is deleted from the CSE list, and the second registration request message corresponding to the first registration request message is sent to all the target CSEs in the CSE list.

Preferably, the step that the second registration request message corresponding to the first registration request message is sent according to the CSE list may include that:

the second registration request message corresponding to the first registration request message is sent according to identifiers or addresses of the target CSEs in the CSE list, wherein the second registration request message may include: an identifier or address of the M2M application and an identifier or address of the local CSE.

Preferably, the method may further include that: after receiving response messages of the second registration request message from all the target CSEs, the local CSE determines a target CSE which is unsuccessfully remotely registered, deletes the target CSE which is unsuccessfully registered from the CSE list and sends a response message of the first registration request message;

wherein the response message of the first registration request message may include the CSE list, and the CSE list may include target CSEs which are successfully remotely registered.

An embodiment of the disclosure further provides a CSE, which may serve as a local CSE, the CSE including: a first receiving module, a reading module and a first sending module, wherein the first receiving module may be configured to receive a first registration request message;

the reading module may be configured to read a CSE list in a remote registration parameter when determining that the first registration request message received by the first receiving module comprises the remote registration parameter and determining that an activation indication parameter in the remote registration parameter represents that remote registration is required to be executed; and the first sending module may be configured to send a second registration request message corresponding to the first registration request message according to the CSE list when determining that the CSE list read by the reading module is not empty and target CSEs in the CSE list have been registered on the local CSE.

Preferably, the CSE may further include a first addition module, configured to, when the CSE list read by the reading module is empty, add a CSE which has been registered on the local CSE into the CSE list.

Preferably, the CSE may further include a second addition module, configured to, when the CSE list read by the reading module is empty, add a CSE matching with a registration strategy into the CSE list according to the pre-configured registration strategy.

Preferably, the CSE may further include a deletion module, configured to, when the CSE list read by the reading module includes a CSE which is not registered on the local CSE, delete the CSE which is not registered on the local CSE from the CSE list.

Preferably, the first sending module may further be configured to send the second registration request message corresponding to the first registration request message according to identifiers or addresses of the target CSEs in the CSE list read by the reading module, wherein the second registration request message may include: an identifier or address of the M2M application and an identifier or address of the local CSE.

Preferably, the CSE may further include an updating module;

the first receiving module may further be configured to receive all response messages of the second registration request message;

the updating module may be configured to determine a target CSE which is unsuccessfully remotely registered according to all the response messages, received by the first receiving module, of the second registration request message, and delete the target CSE which is unsuccessfully remotely registered from the CSE list; and the first sending module may further be configured to send a response message of the first registration request message, the response message of the first registration request message including the CSE list updated by the updating module and the CSE list including target CSEs which are successfully remotely registered.

An embodiment of the disclosure further provides a CSE, which may serve as a target CSE, the CSE including: a second receiving module, a registration module and a second sending module, wherein the second receiving module may be configured to receive a second registration request message;

the registration module may be configured to create a resource according to the second registration request message received by the second receiving module, and acquire and store resource attribute information, wherein the resource attribute information may include a resource address link of the M2M application on a local CSE; and the second sending module may be configured to send a second response message corresponding to the second registration request message after the registration module creates the resource.

An embodiment of the disclosure further provides a system for remote registration of an M2M application, which may include: a local CSE and a target CSE, wherein the local CSE may be configured to receive a first registration request message, read a CSE list in a remote registration parameter when determining that the first registration request message comprises the remote registration parameter and when determining that an activation indication parameter in the remote registration parameter represents that remote registration is required to be executed, and send a second registration request message corresponding to the first registration request message to the target CSE according to the CSE list when determining that the CSE list is not empty and the target CSE in the CSE list has been registered on the local CSE; and the target CSE may be configured to receive the second registration request message from the local CSE, create a resource according to the second registration request message, acquire and store resource attribute information, and send a second response message corresponding to the second registration request message to the local CSE after the resource is created, wherein the resource attribute information may include a resource address link of the M2M application on the local CSE.

Preferably, the local CSE may be configured to, when the CSE list is empty, add a CSE which has been registered on the local CSE into the CSE list, and send the second registration request message corresponding to the first registration request message according to the CSE list.

Preferably, the local CSE may be configured to, when the CSE list is empty, add a CSE matching with a registration strategy into the CSE list according to the pre-configured registration strategy, and send the second registration request message corresponding to the first registration request message according to the CSE list.

Preferably, the local CSE may be configured to, when the local CSE determines that the CSE list includes a CSE which is not registered on the local CSE, delete the CSE which is not registered on the local CSE from the CSE list, and send the second registration request message corresponding to the first registration request message according to the CSE list.

Preferably, the local CSE may be configured to send the second registration request message corresponding to the first registration request message according to an identifier or address of the target CSE in the CSE list, wherein the second registration request message may include: an identifier or address of the M2M application and an identifier or address of the local CSE.

Preferably, the local CSE may be configured to, after receiving all response messages of the second registration request message, determine a target CSE which is unsuccessfully remotely registered, delete the target CSE which is unsuccessfully registered in the CSE list and send a response message of the first registration request message, the response message of the first registration request message including the CSE list and the CSE list including a target CSE which is successfully remotely registered.

An embodiment of the disclosure further provides a computer storage medium, in which a computer-executable instruction may be stored, the computer-executable instruction being configured to execute the method for remote registration of an M2M application, applied to a local CSE, in the embodiment of the disclosure.

An embodiment of the disclosure further provides a computer storage medium, in which a computer-executable instruction may be stored, the computer-executable instruction being configured to execute the method for remote registration of an M2M, applied to a target CSE, in the embodiment of the disclosure.

An embodiment of the disclosure further provides a computer storage medium, in which a computer-executable instruction may be stored, the computer-executable instruction being configured to execute the method for remote registration of an M2M application for interaction between a local CSE and a target CSE in the embodiment of the disclosure.

According to the method, device, system and computer storage medium for remote registration of an M2M application of the embodiments of the disclosure, a local CSE receives a first registration request message sent by the M2M application, and when determining that the first registration request message includes a remote registration parameter and determining that an activation indication parameter in the remote registration parameter represents that remote registration is required to be executed, reads a CSE list in the remote registration parameter; when determining that the CSE list is not empty and the target CSE in the CSE list has been registered on the local CSE, the local CSE sends the second registration request message corresponding to the first registration request message to the target CSE to implement registration of the M2M application on the target CSE, in such a manner, interactions among M2M applications registered on different CSEs are implemented, and a user experience is improved.

DETAILED DESCRIPTION

Figure 1:
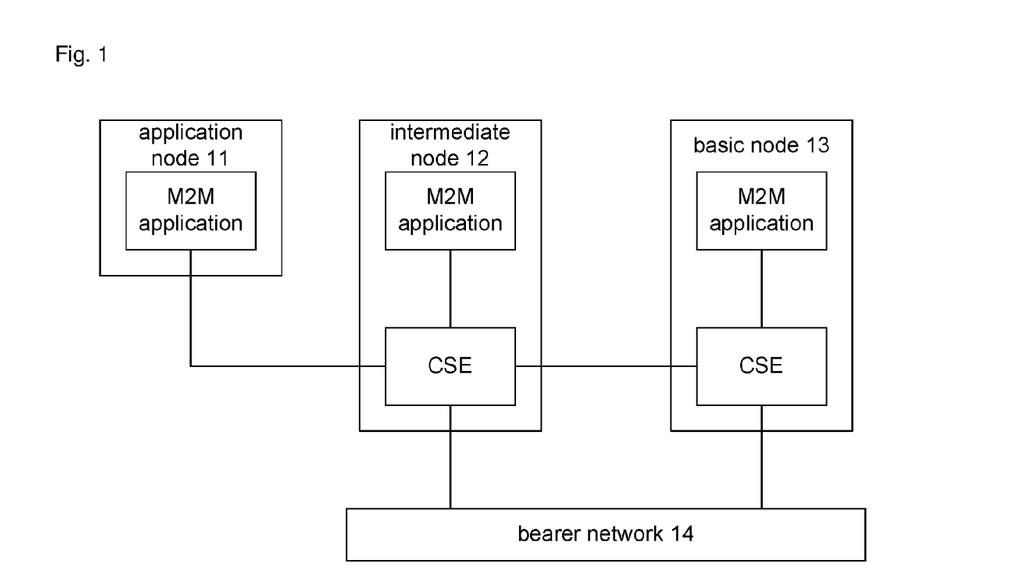
FIG. 1 is a diagram of an application scenario according to an embodiment of the disclosure.

In various embodiments of the disclosure, an M2M communication network consists of an M2M node and a bearer network, and the M2M node at least includes an application or a CSE. FIG. 1 is a diagram of an application scenario according to an embodiment of the disclosure; and as shown in FIG. 1, the application scenario includes: an application node 11, an intermediate node 12, a basic node 13 and a bearer network 14, wherein the application node 11 includes at least one M2M application, but does not include a CSE; the intermediate node 12 includes at least one CSE, and may include one M2M application; and the basic node 13 includes at least one M2M application and at least one CSE. M2M applications implement communications through interaction between CSEs; and the M2M applications are connected to locally registered CSEs through a dedicated interface, and the CSEs communicate with each other through another dedicated interface.

The disclosure will be further described below with reference to the drawings and specific embodiments in detail.

Figure 2:
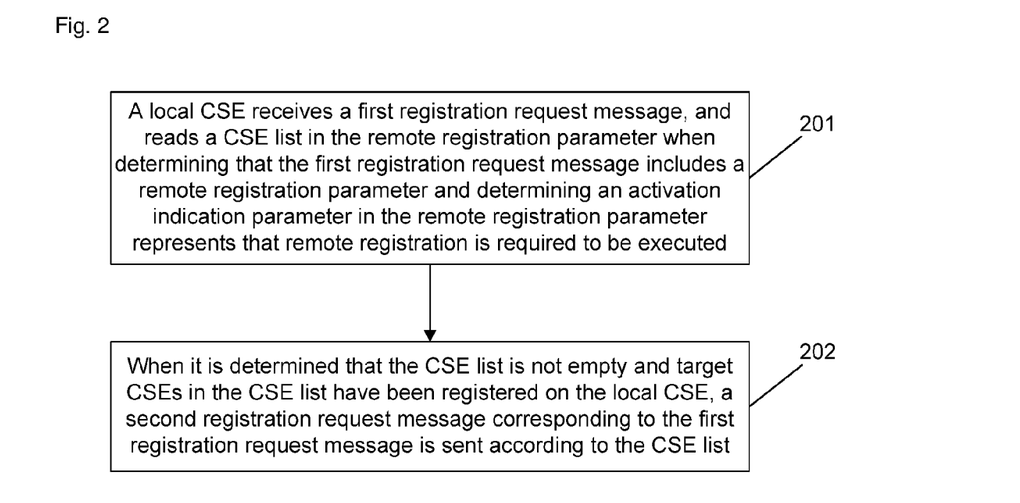
FIG. 2 is a flowchart of a method for remote registration of an M2M application according to a first embodiment of the disclosure.

FIG. 2 is a flowchart of a method for remote registration of an M2M application according to a first embodiment of the disclosure; the embodiment is applied to a local CSE; and as shown in FIG. 2, the method includes the following steps.

Step 201: the local CSE receives a first registration request message, and when determining that the first registration request message includes a remote registration parameter and determining that an activation indication parameter in the remote registration parameter represents that remote registration is required to be executed, reads a CSE list in the remote registration parameter.

Here, the first registration request message is a registration request message sent by the M2M application; the registration request message includes: an identifier or address of the M2M application; specifically, the local CSE creates a resource for the M2M application according to information in the first registration request message after receiving the first registration request message from the M2M application, and stores attribute information of the resource such as the identifier or address of the M2M application, creation time of the resource, valid time of the resource and a retrieval character string; and a process of registration of the M2M application on the local CSE in the embodiment is a conventional art, and will not be elaborated herein.

In the embodiment, the first registration request message may include a remote registration parameter, and the remote registration parameter includes an activation indicator (Activated) and a CSE list (CSE_list), wherein the activation indicator is used to indicate whether the M2M application is required to be remotely registered or not; when the activation indicator is True, it is indicated that the M2M application is required to be remotely registered; when the activation indicator is False, it is indicated that the M2M application is not required to be remotely registered; and the CSE list is configured to indicate CSEs on which the M2M application is required to be remotely registered, wherein a value of the CSE list is an identifier of a target CSE or an address of the target CSE.

Step 202: when it is determined that the CSE list is not empty and target CSEs in the CSE list have been registered on the local CSE, a second registration request message corresponding to the first registration request message is sent according to the CSE list.

Here, registration of one CSE with another CSE includes the following steps that:

a first CSE determines whether registration with a second CSE is required or not according to a pre-configuration; when it is determined that the first CSE is required to be registered on the second CSE, the first CSE sends a registration request message to the second CSE, the registration request message containing an identifier (such as CSE_ID) of the first CSE; and the second CSE establishes and stores a resource attribute information of the first CSE, including a name of the resource, a type of the first CSE, creation time of the resource, valid time of the resource and the like, and sends a registration response message to the first CSE to indicate that the first CSE is successfully registered on the second CSE.

Preferably, when the CSE list is not empty and the local CSE determines that the CSE list includes a CSE which is not registered on the local CSE, the CSE which is not registered on the local CSE is deleted from the CSE list, and a second registration request message corresponding to the first registration request message is sent according to the CSE list to ensure that all target CSEs where the M2M application is remotely registered are target CSEs registered on the local CSE.

Preferably, when the CSE list is empty, the method may further include that: the local CSE adds a CSE which has been registered on the local CSE into the CSE list, and sends the second registration request message corresponding to the first registration request message according to the CSE list.

Or, when the CSE list is empty, the local CSE adds a CSE matching with a registration strategy into the CSE list according to the pre-configured registration strategy, and sends the second registration request message corresponding to the first registration request message according to the CSE list.

Specifically, the local CSE may make a decision about a target CSE on which the M2M application is to be remotely registered according to the preconfigured registration strategy. For example: the local CSE may configure the remote registration strategy according to the type of the target CSE, for example, if the preconfigured strategy is to only register the M2M application on a CSE of a network server type, the local CSE adds the CSE of the network server type into the CSE list; or, if the preconfigured strategy is to only register the M2M application on a CSE of a gateway type, the local CSE adds the CSE of the gateway type into the CSE list, or if the preconfigured strategy is to register the M2M application on the CSEs of the network server type and of the gateway type, the local CSE adds the CSE of the network server type and the CSE of the gateway type into the CSE list.

In the embodiment, the local CSE may send the second registration request message corresponding to the first registration request message according to identifiers or addresses of the target CSEs in the CSE list;

wherein the second registration request message includes: an identifier or address of the M2M application and an identifier or address of the local CSE; specifically, the identifier of the M2M application may be a Uniform Resource Identifier (URI) of a resource created for the M2M application on the local CSE; and the address of the M2M application may be a Uniform Resource Locator (URL) of the resource created for the M2M application on the local CSE.

Preferably, after receiving response messages associated with the second registration request message from all the target CSEs, the local CSE determines a target CSE which is unsuccessfully remotely registered, updates the CSE list, deletes the target CSE which is unsuccessfully remotely registered from the CSE list, and sends a response message of the first registration request message to the M2M application; and the response message of the first registration request message includes the list of CSEs which are successfully remotely registered.

An embodiment of the disclosure further provides a computer storage medium, in which a computer-executable instruction is stored, the computer-executable instruction being configured to execute the remote registration method, applied to the local CSE, for an M2M application in the embodiment of the disclosure.

In another embodiment provided by the disclosure, the method for remote registration of an M2M application further includes that:

the target CSEs receive the second registration request message, create resources according to the second registration request message, store resource attribute information, and send the response messages corresponding to the second registration request message after the resources are created, wherein the resource attribute information includes a resource address link of the M2M application on the local CSE.

Specifically, after receiving the second registration request message from the local CSE, the target CSEs create the resources for the M2M application according to information in the second registration request message, stores the attribute information such as the identifier or address of the M2M application, creation time of the resources, valid time of the resources and retrieval character strings, and store the resource address link of the M2M application on the local CSE; after registration is implemented, the response messages are returned to the local CSE, the response messages indicating that the M2M application is successfully remotely registered on the target CSEs; and when the M2M application is unsuccessfully registered, the target CSEs return response messages to the local CSE, the response messages indicating that the M2M application is failed to be remotely registered on the target CSEs.

An embodiment of the disclosure further provides a computer storage medium, in which a computer-executable instruction is stored, the computer-executable instruction being configured to execute the remote registration method, applied to the target CSE, for the M2M application in the embodiment of the disclosure.

An embodiment of the disclosure further provides a method for remote registration of an M2M application, which includes:

Step 101: a local CSE receives a first registration request message sent by the M2M application, and when determining that the first registration request message includes a remote registration parameter and determining that an activation indication parameter in the remote registration parameter represents that remote registration is required to be executed, reads a CSE list in the remote registration parameter.

Here, the first registration request message is a registration request message sent by the M2M application; the registration request message includes: an identifier or address of the M2M application; specifically, the local CSE creates a resource for the M2M application according to information in the first registration request message after receiving the first registration request message of the M2M application, and stores resource attribute information such as the identifier or address of the M2M application, creation time of the resource, valid time of the resource, and a retrieval character string; and a process of registration of the M2M application on the local CSE in the embodiment is a conventional art, and will not be elaborated herein.

In the embodiment, the first registration request message may include a remote registration parameter, and the remote registration parameter includes an activation indicator (Activated) and a CSE list (CSE_list), wherein the activation indicator is used to indicate whether the M2M application is required to be remotely registered or not; when the activation indicator is True, it is indicated that the M2M application is required to be remotely registered; when the activation indicator is False, it is indicated that the M2M application is not required to be remotely registered; and the CSE list is configured to indicate CSEs on which the M2M application is required to be remotely registered, wherein a value of the CSE list is an identifier of a target CSE or an address of the target CSE.

Step 102: when it is determined that the CSE list is not empty and all target CSEs in the CSE list have been registered on the local CSE, a second registration request message corresponding to the first registration request message is sent to the target CSEs to implement registration of the M2M application on the target CSEs.

Here, registration of one CSE with another CSE includes the following steps that:

a first CSE determines, according to a pre-configuration, whether to register on a second CSE; when it is determined that the first CSE is required to be registered on the second CSE, the first CSE sends a registration request message to the second CSE, the registration request message containing an identifier (such as CSE_ID) of the first CSE; and the second CSE establishes and stores resource attribute information of the first CSE, including a name of the resource, the type of the first CSE, creation time of the resource, valid time of the resource and the like, and sends a registration response message to the first CSE to indicate that the first CSE is successfully registered on the second CSE.

Preferably, when the CSE list is not empty and the local CSE determines that the CSE list includes a CSE which is not registered on the local CSE, the CSE which is not registered on the local CSE is deleted from the CSE list, and a second registration request message corresponding to the first registration request message is sent according to the CSE list to ensure that all the target CSEs where the M2M application is remotely registered are target CSEs registered on the local CSE.

Preferably, when the CSE list is empty, the method further includes that: the local CSE adds a CSE which has been registered on the local CSE into the CSE list, and sends the second registration request message corresponding to the first registration request message according to the CSE list.

Or, when the CSE list is empty, the local CSE adds a CSE matching with a registration strategy into the CSE list according to the pre-configured registration strategy, and sends the second registration request message corresponding to the first registration request message according to the CSE list.

Specifically, the local CSE may make a decision about a target CSE on which the M2M application is to be remotely registered according to the preconfigured registration strategy. For example: the local CSE may configure the remote registration strategy according to the type of the target CSE, for example, if the preconfigured strategy is to register the M2M application on a CSE of a network server type only, the local CSE adds the CSE of the network server type into the CSE list; or, if the preconfigured strategy is to register the M2M application on a CSE of a gateway type only, the local CSE adds the CSE of the gateway type into the CSE list, or if the preconfigured strategy is to register the M2M application on the CSEs of the network server type and of the gateway type, the local CSE adds the CSE of the network server type and the CSE of the gateway type into the CSE list.

In the embodiment, the local CSE may send the second registration request message corresponding to the first registration request message according to identifiers or addresses of the target CSEs in the CSE list;

wherein the second registration request message includes: an identifier or address of the M2M application and an identifier or address of the local CSE; specifically, the identifier of the M2M application may be a Uniform Resource Identifier (URI) of a resource created for the M2M application on the local CSE; and the address of the M2M application may be a URL of the resource created for the M2M application on the local CSE.

Step 103: the target CSEs receive the second registration request message, create resources according to the second registration request message, acquire and store resource attribute information, and send second response messages corresponding to the second registration request message after the resources are created, wherein the resource attribute information includes a resource address link of the M2M application on the local CSE.

Specifically, after receiving the second registration request message sent by the local CSE, the target CSEs create the resources for the M2M application according to the information in the second registration request message, store the attribute information such as the identifier or address of the M2M application, creation time of the resources, valid time of the resources and retrieval character strings, and store the resource address link of the M2M application on the local CSE; after registration is implemented, the response messages are returned to the local CSE, the response messages indicating that the M2M application is successfully remotely registered on the target CSEs; and when the M2M application is unsuccessfully registered, the target CSEs return response messages to the local CSE, the response messages indicating that the M2M application is failed to be remotely registered on the target CSEs.

Preferably, after receiving from all the target CSEs the response messages associated with the second registration request message, the local CSE determines a target CSE which is unsuccessfully remotely registered, updates the CSE list, deletes the target CSE which is unsuccessfully remotely registered from the CSE list, and sends a response message corresponding to the first registration request message to the M2M application; and the response message corresponding to the first registration request message includes the list of CSEs which are successfully remotely registered.

An embodiment of the disclosure further provides a computer storage medium, in which a computer-executable instruction is stored, the computer-executable instruction being configured to execute the method for remote registration of an M2M application in the embodiment of the disclosure.

Figure 3:
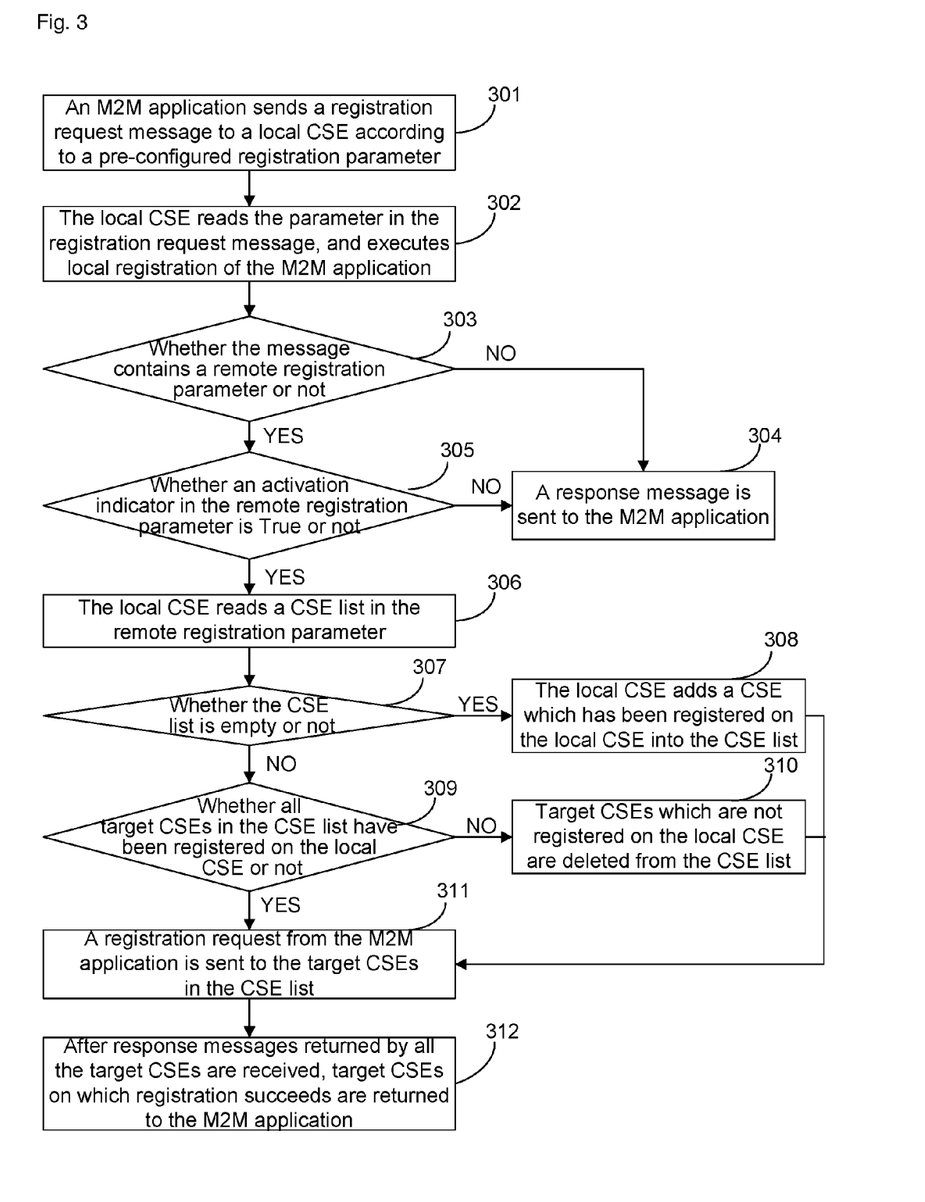
FIG. 3 is a flowchart of a method for remote registration of an M2M application according to a second embodiment of the disclosure.

FIG. 3 is a flowchart of a method for remote registration of an M2M application according to a second embodiment of the disclosure; and as shown in FIG. 3, the method includes the following steps:

Step 301: the M2M application sends a registration request message to a local CSE according to a pre-configured registration parameter.

Here, the pre-configured parameter includes an identifier (CSE_ID) of the local CSE, and the identifier of the local CSE is used to indicate the M2M application to select a specified CSE from all found CSEs for registration.

Here, the registration request message may be contained in a Create Application Resource Request message, and moreover, the Create Application Resource Request message includes: an identifier of the M2M application and an address of the M2M application, and may further include a remote registration parameter, wherein the remote registration parameter includes an activation indicator (Activated) and a CSE list (CSE_list);

the activation indicator is used to indicate whether the M2M application is required to be remotely registered or not; when the activation indicator is True, it is indicated that the M2M application is required to be remotely registered; when the activation indicator is False, it is indicated that the M2M application is not required to be remotely registered; and the CSE list is used to indicate CSEs on which the M2M application is required to be remotely registered.

Step 302: the local CSE reads the parameter in the registration request message, and executes local registration of the M2M application.

Here, the local CSE verifies according to the parameter in the registration request message whether the M2M application has authority to create a resource, and sends a response message to the M2M application to indicate that it has no registration authority when determining that the M2M application has no authority to create a resource; the local CSE retrieves a locally created resource according to the identifier of the M2M application or the address of the M2M application when determining that the M2M application has authority to create a resource, and sends a response message to the M2M application to indicate that the M2M application has been registered and the resource has existed when determining that the identifier of the M2M application or the address of the M2M application has been stored; and when determining that the identifier of the M2M application or the address of the M2M application does not exist, the local CSE creates a resource for the M2M application, stores attribute information such as the identifier of the M2M application or the address of the M2M application, creation time of the resource, valid time of the resource and a retrieval characteristic string, and stores the resource for the M2M application.

Step 303: whether the remote registration parameter is contained in the message or not is determined, Step 304 is executed if a determination result is NO, and Step 305 is executed if the determination result is YES.

Step 304: a response message is sent to the M2M application, the response message indicating that the M2M application is successfully registered on the local CSE.

Step 305: whether the activation indicator in the remote registration parameter is True or not is determined, Step 304 is executed if a determination result is NO, and Step 306 is executed if the determination result is YES.

Step 306: the local CSE reads the CSE list in the remote registration parameter.

Step 307: whether the CSE list is empty or not is determined, Step 308 is executed if a determination result is YES, and Step 309 is executed if the determination result is NO.

Step 308: the local CSE adds a CSE which has been registered on the local CSE into the CSE list, and Step 311 is executed.

In the embodiment, a target CSE implements registration on the local CSE in advance; and the target CSE may determine whether registration with the local CSE is required or not according to a pre-configuration. When it is determined that the target CSE is required to be registered on the local CSE, the target CSE sends a registration request to the local CSE, the registration request containing an identifier (such as CSE_ID) of the target CSE; and the local CSE establishes and stores resource information of the target CSE, including a name of a resource, the type of the target CSE, creation time of the resource, valid time of the resource and the like, and sends a registration response message to the target CSE to indicate that the target CSE is successfully registered on the local CSE.

Step 309: whether all target CSEs in the CSE list have been registered on the local CSE or not is determined, Step 310 is executed if a determination result is NO, and Step 311 is executed if the determination result is YES.

Step 310: target CSEs which are not registered on the local CSE are deleted from the CSE list, and Step 311 is executed.

Step 311: a registration request from the M2M application is sent to the target CSEs in the CSE list.

Here, the target CSEs create resources for the M2M application according to the information in the registration request after receiving the registration request sent by the local CSE, store the attribute information such as the identifier of the M2M application or the address of the M2M application, creation time of the resources, valid time of the resources and retrieval character strings, and store a resource address link of the M2M application on the local CSE; after registration is implemented, response messages are returned to the local CSE, the response messages indicating that the M2M application is successfully remotely registered on the target CSEs; and when the M2M application is unsuccessfully registered, the target CSEs return response messages to the local CSE, the response messages indicating that the M2M application is failed to be remotely registered on the target CSEs.

Step 312: after the response messages returned by all the target CSEs are received, the target CSEs on which the M2M application is successfully registered are notified to the M2M application.

Here, the local CSE notified the M2M application of the target CSEs on which remote registration succeeds after receiving the response messages returned by all the target CSEs; and specifically, the local CSE updates the CSE list, deletes from the CSE list the target CSEs on which registration fails, the updated list namely including identifiers or addresses of the target CSEs on which remote registration succeeds only, and the local CSE sends the remote registration parameter (including the activation indicator and the updated CSE list) to the M2M application through a response message.

An embodiment of the disclosure further provides a computer storage medium, in which a computer-executable instruction is stored, the computer-executable instruction being configured to execute the method for remote registration of an M2M application in the embodiment of the disclosure.

Figure 4:
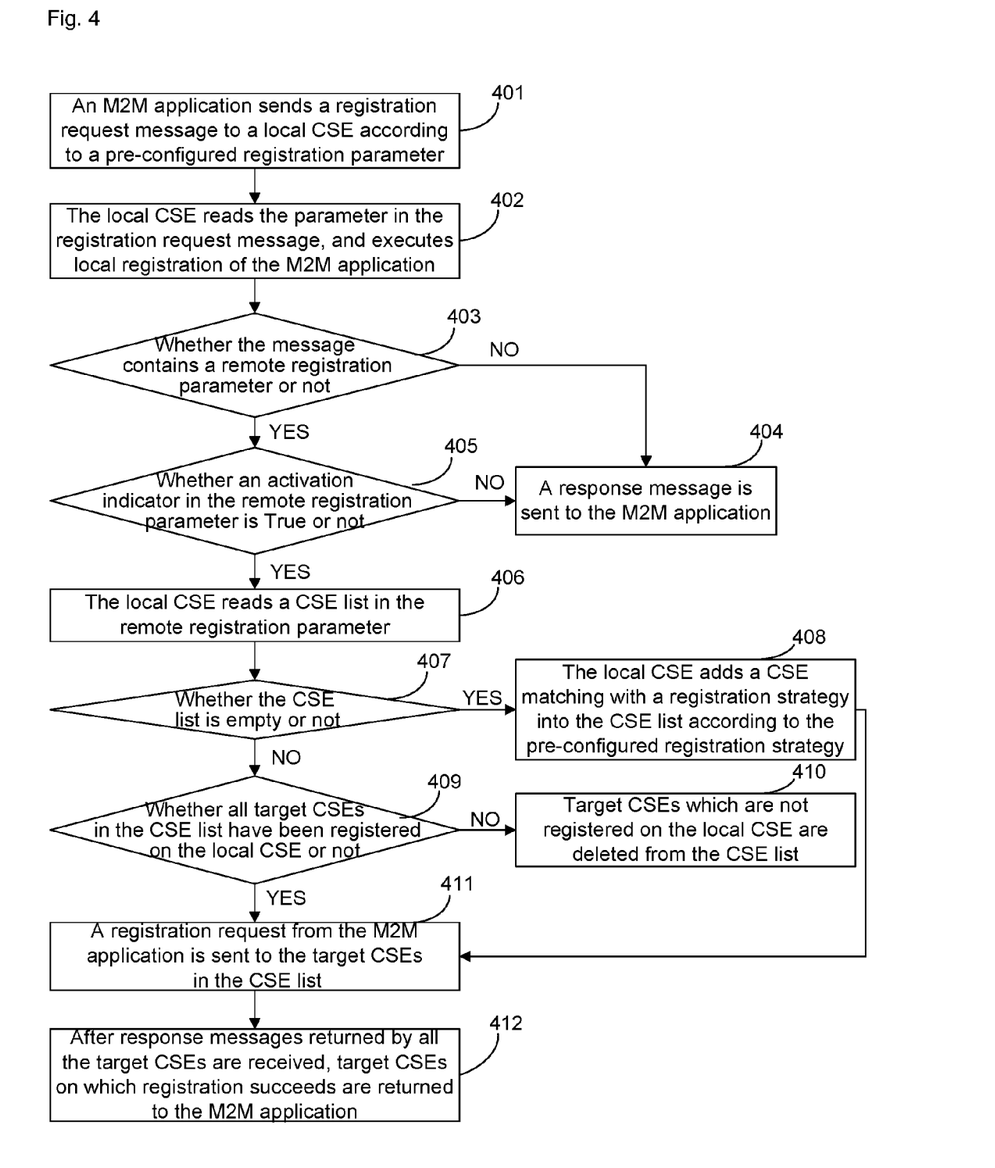
FIG. 4 is a flowchart of a method for remote registration of an M2M application according to a third embodiment of the disclosure.

FIG. 4 is a flowchart of a method for remote registration of an M2M application according to a third embodiment of the disclosure; and as shown in FIG. 4, the method includes the following steps:

Step 401: the M2M application sends a registration request message to a local CSE according to a pre-configured registration parameter.

Here, the pre-configured parameter includes an identifier (CSE_ID) of the local CSE, and the identifier of the local CSE is configured to indicate the M2M application to select a specified CSE from all found CSEs for registration.

Here, the registration request message may be contained in a Create Application Resource Request message, and moreover, the Create Application Resource Request message includes: an identifier of the M2M application and an address of the M2M application, and may further include a remote registration parameter, wherein the remote registration parameter includes an activation indicator (Activated) and a CSE list (CSE_list);

the activation indicator is configured to indicate whether the M2M application is required to be remotely registered or not; when the activation indicator is True, it is indicated that the M2M application is required to be remotely registered; when the activation indicator is False, it is indicated that the M2M application is not required to be remotely registered; and the CSE list is used to indicate CSEs on which the M2M application is required to be remotely registered.

Step 402: the local CSE reads the parameter in the registration request message, and executes local registration of the M2M application.

Here, the local CSE verifies whether the M2M application has authority of resource creation or not according to the parameter in the message, and sends a response message to the M2M application to indicate that it has no registration permission when determining that the M2M application has no authority of resource creation; the local CSE retrieves a locally created resource according to the identifier of the M2M application or the address of the M2M application when determining that the M2M application has the authority of resource creation, and sends a response message to the M2M application to indicate that the M2M application has been registered and the resource has existed when determining that the identifier of the M2M application or the address of the M2M application has been stored; and when determining that the identifier of the M2M application or the address of the M2M application does not exist, the local CSE creates a resource for the M2M application, stores attribute information such as the identifier of the M2M application or the address of the M2M application, creation time of the resource, valid time of the resource, and a retrieval characteristic string, and stores the resource for the M2M application.

Step 403: whether the remote registration parameter is contained in the message or not is determined, Step 404 is executed if a determination result is NO, and Step 405 is executed if the determination result is YES.

Step 404: a response message is sent to the M2M application, the response message indicating that the M2M application is successfully registered on the local CSE.

Step 405: whether the activation indicator in the remote registration parameter is True or not is determined, Step 404 is executed if a determination result is NO, and Step 406 is executed if the determination result is YES.

Step 406: the local CSE reads the CSE list in the remote registration parameter.

Step 407: whether the CSE list is empty or not is determined, Step 408 is executed if a determination result is YES, and Step 409 is executed if the determination result is NO.

Step 408: the local CSE adds a CSE matching with a registration strategy into the CSE list according to the pre-configured registration strategy, and Step 411 is executed.

In the embodiment, the local CSE may configure the remote registration strategy in advance, and when the CSE list is empty, the local CSE may make a decision about a target CSE on which the M2M application is to be remotely registered according to the preconfigured registration strategy. For example: the local CSE may configure the remote registration strategy according to the type of the target CSE, and for example, if the preconfigured strategy is to register the M2M application on a CSE of a network server type only, the local CSE adds the CSE of the network server type into the CSE list; or, if the preconfigured strategy is to register the M2M application on a CSE of a gateway type only, the local CSE adds the CSE of the gateway type into the CSE list, or if the preconfigured strategy is to register the M2M application on the CSEs of the network server type and of the gateway type, the local CSE adds the CSE of the network server type and the CSE of the gateway type into the CSE list.

Step 409: whether all target CSEs in the CSE list have been registered on the local CSE or not is determined, Step 410 is executed if a determination result is NO, and Step 411 is executed if the determination result is YES.

In the embodiment, the target CSEs finish registration on the local CSE in advance; and the target CSEs may determine whether registration on the local CSE is required or not according to a pre-configuration. When it is determined that the target CSEs are required to be registered on the local CSE, the target CSEs send registration requests to the local CSE, the registration requests containing identifiers (such as CSE_ID) of the target CSEs; and the local CSE establishes and stores resource information of the target CSEs, including names of resources, types of the target CSEs, creation time of the resources, valid time of the resources and the like, and send registration response messages to the target CSEs to indicate that the target CSEs are successfully registered on the local CSE.

Step 410: target CSEs which are not registered on the local CSE are deleted from the CSE list, and Step 411 is executed.

Step 411: a registration request from the M2M application is sent to the target CSEs in the CSE list.

Preferably, the target CSEs create resources for the M2M application according to the information in the registration request after receiving the registration request sent by the local CSE, store the attribute information such as the identifier of the M2M application or the address of the M2M application, creation time of the resources, valid time of the resources and retrieval character strings, and store a resource address link of the M2M application on the local CSE; after registration is implemented, response messages are returned to the local CSE, the response messages indicating that the M2M application is successfully remotely registered on the target CSEs; and when the M2M application is unsuccessfully registered, the target CSEs return response messages to the local CSE, the response messages indicating that the M2M application is failed to be remotely registered on the target CSEs.

Step 412: after the response messages returned by all the target CSEs are received, the target CSEs on which the M2M application is successfully registered are notified to the M2M application.

Here, the local CSE returns the target CSEs on which remote registration succeeds to the M2M application after receiving the response messages returned by all the target CSEs; and specifically, the local CSE updates the CSE list, deletes from the CSE list the target CSEs on which registration fails, the updated list namely including identifiers or addresses of the target CSEs on which remote registration succeeds only, and sends the remote registration parameter (including the activation indicator and the updated CSE list) to the M2M application through a response message.

An embodiment of the disclosure further provides a computer storage medium, in which a computer-executable instruction is stored, the computer-executable instruction being configured to execute the remote registration method for the M2M application in the embodiment of the disclosure.

Figure 5:
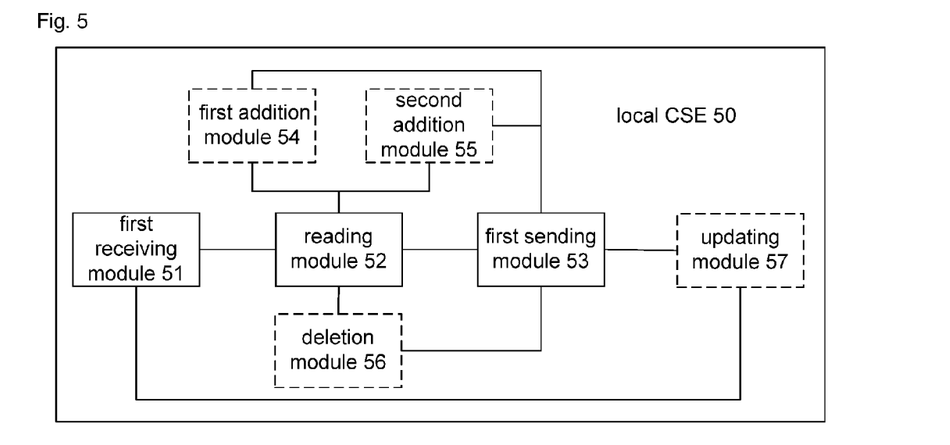
FIG. 5 is a structure diagram of a CSE according to a first embodiment of the disclosure.

FIG. 5 is a structure diagram of a CSE according to an embodiment of the disclosure, and the CSE serves as a local CSE; and as shown in FIG. 5, the local CSE 50 includes: a first receiving module 51, a reading module 52 and a first sending module 53, wherein the first receiving module 51 is configured to receive a first registration request message;

the reading module 52 is configured to when determining that the first registration request message received by the first receiving module 51 includes a remote registration parameter and determining that an activation indication parameter in the remote registration parameter represents that remote registration is required to be executed, read a CSE list in the remote registration parameter; and the first sending module 53 is configured to, when it is determined that the CSE list read by the reading module 52 is not empty and target CSEs in the CSE list have been registered on the local CSE, send a second registration request message corresponding to the first registration request message according to the CSE list.

Preferably, the CSE further includes a first addition module 54, configured to, when the CSE list read by the reading module 52 is empty, add a CSE which has been registered on the local CSE into the CSE list.

Preferably, the CSE further includes a second addition module 55, configured to, when the CSE list read by the reading module 52 is empty, add a CSE matching with a registration strategy into the CSE list according to the pre-configured registration strategy.

Preferably, the CSE further includes a deletion module 56, configured to, when the CSE list read by the reading module 52 includes a CSE which is not registered on the local CSE, delete the CSE which is not registered on the local CSE from the CSE list.

Preferably, the first sending module 53 is further configured to send the second registration request message corresponding to the first registration request message according to identifiers or addresses of the target CSEs in the CSE list read by the reading module 52, wherein the second registration request message includes: an identifier or address of the M2M application and an identifier or address of the local CSE.

Preferably, the CSE further includes an updating module 57;

the first receiving module 51 is further configured to receive all response messages corresponding to the second registration request message;

the updating module 57 is configured to determine a target CSE which is unsuccessfully remotely registered according to all the response messages, received by the first receiving module 51, of the second registration request message, and delete from the CSE list the target CSE which is unsuccessfully remotely registered; and the first sending module 53 is further configured to send a response message of the first registration request message, the response message of the first registration request message including the CSE list updated by the updating module 57 and the CSE list including target CSEs which are successfully remotely registered.

Those skilled in the art should understand that functions of each processing unit in the local CSE of the embodiments of the disclosure may be understood with reference to related description in the abovementioned method for remote registration of an M2M application, and each processing unit in the local CSE of the embodiments of the disclosure may be implemented by analogue circuits which realize the functions in the embodiments of the disclosure, and may also be implemented by operation of software which executes the functions in the embodiments of the disclosure on a smart terminal.

In the embodiment, the local CSE may be arranged in an intermediate node or a basic node; the intermediate node may be a gateway; the basic node may be a network server, wherein the reading module 52, the first addition module 54, the second addition module 55, the updating module 57 and the deletion module 56 in the local CSE may be implemented by a Central Processing Unit (CPU), a Digital Signal Processor (DSP) or a Field-Programmable Gate Array (FPGA) in the CSE during a practical application; and the first receiving module 51 and the first sending module 53 may be implemented by a transmission and receiving device or a transceiver in the CSE in the practise.

Figure 6:
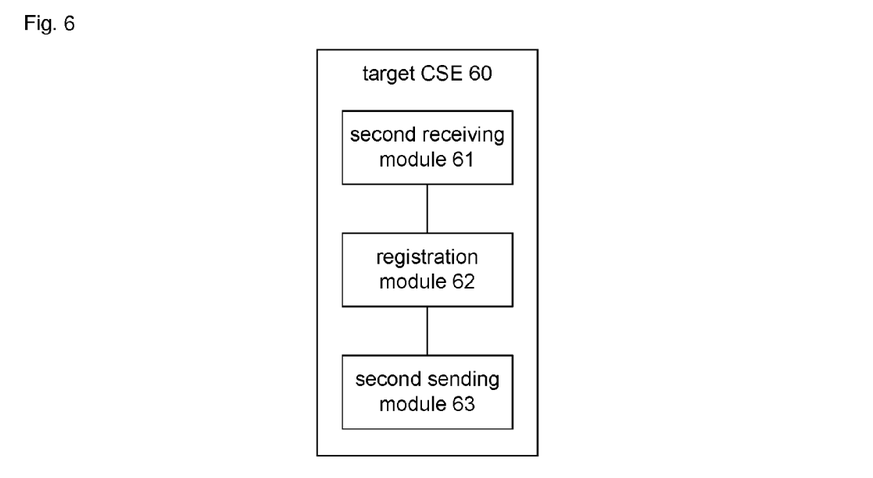
FIG. 6 is a structure diagram of a CSE according to a second embodiment of the disclosure.

FIG. 6 is a structure diagram of a CSE according to an embodiment of the disclosure, and the CSE serves as a target CSE; and as shown in FIG. 6, the target CSE 60 includes: a second receiving module 61, a registration module 62 and a second sending module 63, wherein the second receiving module 61 is configured to receive a second registration request message;

the registration module 62 is configured to create a resource according to the second registration request message received by the second receiving module 61, and acquire and store resource attribute information, wherein the resource attribute information includes a resource address link of the M2M application on a local CSE; and the second sending module 63 is configured to send a second response message corresponding to the second registration request message after the registration module 62 creates the resource.

Those skilled in the art should understand that functions of each processing unit in the target CSE of the embodiments of the disclosure may be understood with reference to related description in the abovementioned remote registration method for the M2M application, and each processing unit in the target CSE of the embodiments of the disclosure may be implemented by analogue circuits which realize the functions in the embodiment of the disclosure, and may also be implemented by operation of software which executes the functions in the embodiments of the disclosure on an intelligent terminal.

In the embodiment, the target CSE may be arranged in an intermediate node or a basic node; the intermediate node may be a gateway; the basic node may be a network server, wherein the registration module 62 in the target CSE may be implemented by a CPU, DSP or FPGA in the CSE; and the second receiving module 61 and the second sending module 63 may be implemented by a transmission and receiving device or transceiver in the CSE during the practise.

Figure 7:
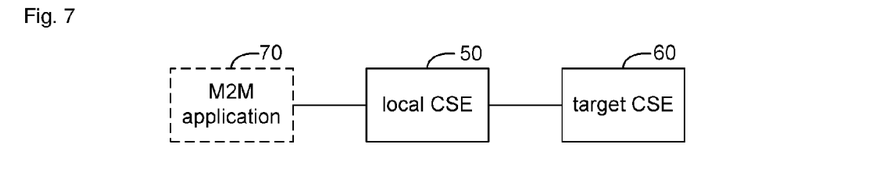
FIG. 7 is a structure diagram of a system for remote registration of an M2M application according to an embodiment of the disclosure.

FIG. 7 is a structure diagram of a system for remote registration of an M2M application according to an embodiment of the disclosure, and the system includes: a local CSE 50 and a target CSE 60, wherein the local CSE 50 is configured to receive a first registration request message, and when determining that the first registration request message includes a remote registration parameter and determining that an activation indication parameter in the remote registration parameter represents that remote registration is required to be executed, read a CSE list in the remote registration parameter, and send a second registration request message corresponding to the first registration request message to the target CSE 60 according to the CSE list when it is determined that the CSE list is not empty and the target CSE 60 in the CSE list has been registered on the local CSE; and the target CSE 60 is configured to receive the second registration request message sent by the local CSE 50, create a resource according to the second registration request message, acquire and store resource attribute information, and send a second response message corresponding to the second registration request message to the local CSE 50 after the resource is created, wherein the resource attribute information may include a resource address link of the M2M application on the local CSE 50.

Specifically, the local CSE 50 is configured to, when the CSE list is empty, add a CSE which has been registered on the local CSE 50 into the CSE list, and send the second registration request message corresponding to the first registration request message according to the CSE list.

Specifically, the local CSE 50 is configured to, when the CSE list is empty, add a CSE matching with a registration strategy into the CSE list according to the pre-configured registration strategy, and send the second registration request message corresponding to the first registration request message according to the CSE list.

Specifically, the local CSE 50 is configured to, when the local CSE determines that the CSE list includes a CSE which is not registered on the local CSE 50, delete the CSE which is not registered on the local CSE from the CSE list, and send the second registration request message corresponding to the first registration request message according to the CSE list.

Specifically, the local CSE 50 is configured to send the second registration request message corresponding to the first registration request message according to an identifier or address of the target CSE in the CSE list, wherein the second registration request message may include: an identifier or address of the M2M application and an identifier or address of the local CSE.

Specifically, the local CSE 50 is configured to, after receiving all response messages related to the second registration request message, determine a target CSE which is unsuccessfully remotely registered, delete the target CSE which is unsuccessfully registered from the CSE list and send a response message of the first registration request message, the response message of the first registration request message including the CSE list and the CSE list including a target CSE which is successfully remotely registered.

In the embodiment, the local CSE and the target CSE may be arranged in an intermediate node or a basic node; the intermediate node may be a gateway; the basic node may be a network server, and provides a management platform for the M2M application; and the M2M application may be arranged in various application terminals, such as a vending machine, a camera, various household appliances and an alarm.

The disclosure is described with reference to flowcharts and/or block diagrams of the method, device and computer program product according to the embodiments of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or other programmable data processing equipment, so that a series of operating steps are executed on the computer or other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above are only the preferred embodiments of the disclosure and not intended to limit the scope of protection of the disclosure.

INDUSTRIAL PRACTICABILITY

According to the embodiments of the disclosure, a local CSE receives a first registration request message from an M2M application, reads a CSE list in a remote registration parameter when determining that the first registration request message includes the remote registration parameter and when determining that the activation indication parameter in the remote registration parameter represents that remote registration is required to be executed, and when it is determined that the CSE list is not empty and the target CSE in the CSE list has been registered on the local CSE, the local CSE sends the second registration request message corresponding to the first registration request message to the target CSE to implement registration of the M2M application on the target CSE, in such a manner, interaction of M2M applications registered on different CSEs is implemented, and a user experience is improved.

What is claimed is:

1. A method for remote registration of a Machine-to-Machine (M2M) application, comprising:
   receiving, by a local Common Service Entity (CSE), a first registration request message from the M2M application, so that the M2M application is locally registered on the local CSE;
   reading, by the local CSE, a CSE list in a remote registration parameter when determining that the first registration request message comprises the remote registration parameter and determining that an activation indication parameter in the remote registration parameter represents that remote registration is required to be executed; and
   sending, by the local CSE, a second registration request message corresponding to the first registration request message to target CSEs in the CSE list according to identifiers or addresses of the target CSEs so that the M2M application is remotely registered on the target CSEs, when determining that the CSE list is not empty and the target CSEs in the CSE list have been registered on the local CSE;
   wherein the CSE list comprises the identifiers or addresses of the target CSEs; and the second registration request message comprises: an identifier or address of the M2M application, and an identifier or address of the local CSE.

2. The method according to claim 1, when the CSE list is empty, the method further comprising:
   adding, by the local CSE, a CSE which has been registered on the local CSE into the CSE list, and sending the second registration request message corresponding to the first registration request message according to the CSE list.

3. The method according to claim 1, when the CSE list is empty, the method further comprising:
   adding, by the local CSE, a CSE matching with a registration strategy into the CSE list according to the registration strategy which is configured in advance, and sending the second registration request message corresponding to the first registration request message according to the CSE list.

4. The method according to claim 1, when the local CSE determines that the CSE list comprises a CSE which is not registered on the local CSE, the method further comprising:
   deleting the CSE which is not registered on the local CSE from the CSE list, and sending the second registration request message corresponding to the first registration request message according to the CSE list.

5. The method according to claim 1, further comprising:
   after receiving all response messages of the second registration request message, determining, by the local CSE, a target CSE on which the M2M application is unsuccessfully remotely registered, deleting from the CSE list the target CSE on which the M2M application is unsuccessfully remotely registered, and sending a response message of the first registration request message;
   wherein the response message of the first registration request message comprises the CSE list, and the CSE list comprises target CSEs on which the M2M application is successfully remotely registered.

6. The method according to claim 1, further comprising:
   receiving, by the target CSEs, the second registration request message from the local CSE, creating a resource according to the second registration request message, acquiring and storing resource attribute information, and sending a second response message corresponding to the second registration request message to the local CSE after the resource is created,
   wherein the resource attribute information comprises a resource address link of the M2M application on the local CSE.

7. A Common Service Entity (CSE), wherein when the CSE is served as a local CSE, the CSE comprising: a first receiving module, a reading module and a first sending module, wherein
   the first receiving module is configured to receive a first registration request message from a Machine-to-Machine (M2M) application, so that the M2M application is locally registered on the local CSE;
   the reading module is configured to read a CSE list in a remote registration parameter when determining that the first registration request message received by the first receiving module comprises the remote registration parameter and determine that an activation indication parameter in the remote registration parameter represents that remote registration is required to be executed;
   the first sending module is configured to send a second registration request message corresponding to the first registration request message to target CSEs in the CSE list according to identifiers or addresses of the target CSEs so that the M2M application is remotely registered on the target CSEs, when determining that the CSE list read by the reading module is not empty and target CSEs in the CSE list have been registered on the local CSE; and
   the CSE list comprises the identifiers or addresses of the target CSEs; and the second registration request message comprises: an identifier or address of the M2M application, and an identifier or address of the local CSE.

8. The CSE according to claim 7, further comprising a first addition module, configured to, when the CSE list read by the reading module is empty, add a CSE which has been registered on the local CSE into the CSE list.

9. The CSE according to claim 7, further comprising a second addition module, configured to, when the CSE list read by the reading module is empty, add a CSE matching with a registration strategy into the CSE list according to the registration strategy which is configured in advance.

10. The CSE according to claim 7, further comprising a deletion module, configured to, when the CSE list read by the reading module comprises a CSE which is not registered on the local CSE, delete the CSE which is not registered on the local CSE from the CSE list.

11. The CSE according to claim 7, further comprising an updating module, wherein
the first receiving module is further configured to receive all response messages of the second registration request message;
the updating module is configured to determine a target CSE on which the M2M application is unsuccessfully remotely registered according to all the response messages, received by the first receiving module, of the second registration request message, and delete from the CSE list the target CSE on which the M2M application is unsuccessfully remotely registered; and
the first sending module is further configured to send a response message of the first registration request message, the response message of the first registration request message comprising the CSE list updated by the updating module and the CSE list comprising target CSEs on which the M2M application is successfully remotely registered.

12. The CSE according to claim 7, when the CSE is served as a target CSE and comprising: a second receiving module, a registration module and a second sending module, wherein
the second receiving module is configured to receive the second registration request message from the local CSE;
the registration module is configured to create a resource according to the second registration request message received by the second receiving module, and acquire and store resource attribute information, wherein the resource attribute information comprises a resource address link of a Machine-to-Machine (M2M) application on a local CSE; and
the second sending module is configured to send a second response message corresponding to the second registration request message to the local CSE after the registration module creates the resource.

13. A non-transitory computer storage medium, in which a computer-executable instruction is stored, the computer-executable instruction being configured to execute the method for remote registration of an M2M application according to claim 1.

* * * * *